April 20, 1937. P. J. S. CRAMER 2,077,617
MANUFACTURE OF RUBBER PRODUCTS
Filed April 14, 1933
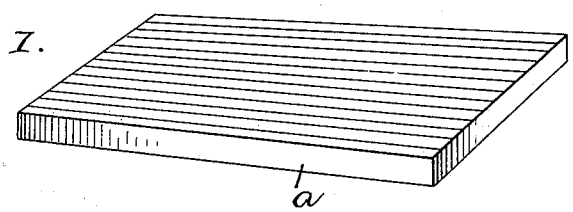
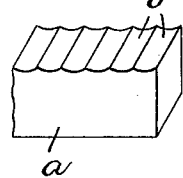
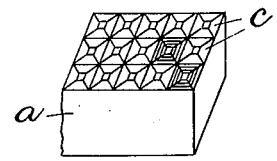
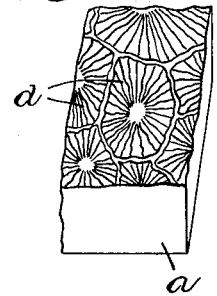
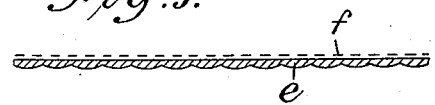
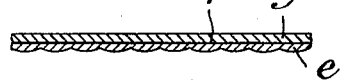
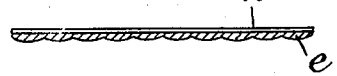
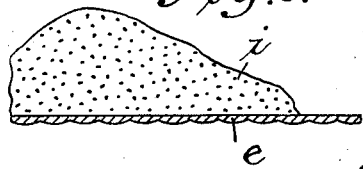
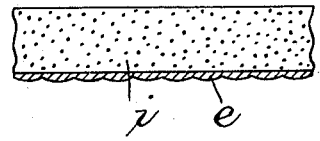
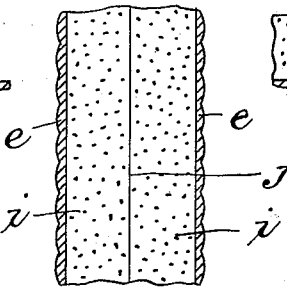
Inventor
Pieter J. S. Cramer
By Foster Rodier
Attorneys

UNITED STATES PATENT OFFICE 2,077,617

MANUFACTURE OF RUBBER PRODUCTS

Pieter J. S. Cramer, Chesieres Lur Ollon, Switzerland, assignor to Septa, S. A., Luxembourg, Luxembourg, a "Société anonyme holding" under the laws of Luxembourg Application April 14, 1933, Serial No. 666,190
In Great Britain April 27, 1932

4 Claims. (Cl. 154—2)

This invention relates to the manufacture of rubber products and more particularly materials of a fibrous or granular nature having a foundation or a surface coating of soft rubber (i. e. not ebonite) and adapted for use as insulating partitions, floor-coverings, wall-paper, wrappings and the like, the thickness of the product varying according to the purpose for which it is intended.

It has already been proposed to employ rubber latex in the preparation of rubberized fabric and other rubber goods, by applying latex direct to the material to be treated and thereafter allowing the rubber to deposit from the latex in situ, or by similarly depositing the rubber upon a backing which can either serve as a transfer medium for subsequent application to the material to be treated, the backing being removed before vulcanization, or can be allowed to remain as an integral part of the finished article. It has likewise been proposed to employ rubber latex for the production of adherent rubber coatings, for example upon rubber, leather and other materials to be united together, by spraying latex upon the surface of the material, the union of two coated surfaces being effected by vulcanizing under pressure. It has further been proposed to unite two pieces of material obtained directly on deposition strata from rubber latex or the like by bringing them into intimate contact while still in a moist or wet state or in a partially or incompletely dried or coagulated condition, in one example, a textile fabric impregnated with an aqueous rubber dispersion was to be united to a rubber deposit from an aqueous rubber dispersion.

According to the present invention, the liquid latex as obtained by tapping or the like, or mixed if desired with coloring matter, fillers, and/or vulcanizing agents, is spread or poured upon a plate and allowed to dry, and the sheet of dry rubber produced by the drying of the latex is combined with porous, fibrous or granular reinforcing material applied to the surface of the sheet, utilizing latex itself in its liquid state as the binding agent between the dry rubber and the reinforcing material, the rubber sheet being removed from the plate before or after reinforcement. The plate on which the latex is spread or poured may consist of glass, metal or like non-porous material, fixed in a substantially horizontal position, and its upper surface is preferably impressed or embossed with suitable grooves or designs in relief or intaglio, giving a rough surface, that is, not smooth, so as to increase the amount of latex held by capillary attraction and to accelerate the setting or drying of the latex, which may be assisted by warming the plate and by submission to a current of heated air after the spreading or pouring of the latex. The first layer may be followed by a second and if desired by additional layers, which unite perfectly with the first and become a coherent solid mass of soft rubber, conforming with the grooved or relieved surface of the plate on which the latex has been poured. A porous sheet prepared for example from latex mixed with a discrete material, or a fibrous material in sheet form, consisting for example of paper, tissue or fabric, can be pressed upon the surface of the soft rubber sheet, after this surface has been wetted or covered with liquid latex, either before or after its removal from the plate. The fibrous material is laid upon the wetted surface of the rubber and brought into contact by slight pressure with the fingers or by other convenient means. It will be noted that the rubber sheet is wetted with the binding latex without providing for the evaporation of the water contained in the latter by heating before it reaches the surface of the sheet, so that when the reinforcing material is applied, the binding latex will be still in its liquid state at ordinary temperature, which assures its desired penetration into the porous or fibrous (and therefore absorbent) reinforcing material. Upon drying, the rubber setting from the surface layer of liquid latex will become integral with the dry rubber sheet and will unite that sheet on one side with the porous or fibrous material on the other; it has been found that even in the case of paper the quantity of binding latex used may be so small that it does not impregnate the fibers throughout the thickness of the reinforcing material, which retains its flexibility after the latex has set into rubber. Vulcanization can be performed in any desired manner, and metallic "bronzing" or like powders may be added to the latex or sprinkled upon the rubber sheet before vulcanizing, to produce a decorative effect.

When employing granular or other discrete material to be combined with the rubber sheet or foundation, the material, consisting for example of cork dust or of rice husks or other granular product, may be mixed up with latex to form a mass or agglomerate, which is then spread upon the surface of the rubber sheet, the latter having been wetted again with latex if desired. As in the case of a fibrous material, the latex will unite the dry rubber sheet on one side with the reinforcing material on the other, but the latex setting or draining from the granular mass will also act to produce the union, so that the previous wetting of the rubber sheet with latex will not always be necessary. The quantity of latex used for mixing with the granular material will depend upon the nature of the latter and upon the product to be obtained. Two compound sheets, each consisting of granular material covering a rubber sheet, may be united together back to back, by means of an intermediate layer of latex, so as to form flexible slabs suitable for soundproof and heat-insulating linings, impervious to moisture, and sufficiently resilient to reduce liability to surface damage.

In order to illustrate how the invention is to be carried out, I will now describe in detail two examples of the method, referring to the accompanying diagrammatic drawing, in which:

Figure 1 represents a perspective view of a flat horizontal plate upon which the liquid latex is to be poured.

Figures 2, 3 and 4 are details on a larger scale, also in perspective, showing suitable forms of plate surface.

Figure 5 represents in section part of a film or sheet of dry rubber stripped from the plate and spread with a fresh layer of latex.

Figures 6 and 7 are similar sections showing respectively a piece of felt and a sheet of paper laid on the rubber film and united thereto by latex.

Figure 8 represents in section part of a dry rubber film having a mixture of latex and cork dust spread upon it.

Figure 9 shows the reinforced sheet produced by the drying of the latex from the said mixture as shown in Fig. 8, after being smoothed out.

Figure 10 represents an insulating slab prepared from two such reinforced sheets.

*Example A—Wall coverings.*—A flat glass plate *a* with parallel transverse grooves *b*, as shown in Figure 2, pyramidal indentations *c*, as shown in Figure 3, or moulded figuring *d*, similar to that of ornamental window glass, as shown in Figure 4, is laid in a horizontal position, as in Figure 1.

Some latex, coloured with a dye stuff, is poured on the glass plate *a*, which is slightly heated, for example to 40° C., till the rubber is dry. Then the thin film or sheet of dry rubber *e*, (Figure 5) having the imprint of the grooves or figuring upon the plate, is stripped from the glass, spread on a table, and a small quantity of latex (indicated by the dotted line *f*) spread over it, just sufficient to wet its top surface. Now a piece of felt *g* in dry condition (i. e. not impregnated beforehand) is laid on the wetted sheet, sufficient pressure being obtained by placing a board upon the felt; the layer of latex is then allowed to dry, producing the reinforced sheet seen in Figure 6, where the thick line *f* represents the last layer of latex, now become integral with the sheet *e* and combining it with the felt *g*, while partially impregnating the latter. It will be found almost impossible to separate the felt from the sheet of rubber; if one tries to tear it off, the felt will split into two layers, one impregnated and the other not. If the latex is coloured differently from the felt, the design caused by the grooves of the glass plate will stand out and a highly ornamental effect will be obtained. Instead of felt, there may be employed a sheet of paper *h*, producing a composite sheet as seen in Figure 7.

*Example B—Insulation sheets.*—As in the previous Example A a glass plate is covered with latex to produce by drying a thin layer of rubber *e*; then a carefully stirred mixture *i* of fine cork-dust and liquid latex is spread over it, while still in situ, as shown in Figure 8, to make up a mass or layer, which may be, for example, half an inch thick, and allowed to dry.

In this manner a sheet of rubber, reinforced with a layer of cork and rubber, is obtained, as illustrated in Figure 9; such sheets form an excellent insulation against heat, noise and moisture, and two such sheets may be united together by means of an intermediate layer of liquid latex at *j*, to form a "board" or slab with the two original sheets on the outer faces, as shown in Figure 10.

From the above example, it will be understood how the method is applied, but the cases in which it may be useful are not limited to those; all kinds of variations and combinations are possible. The latex used for preparing the first sheet of rubber can be concentrated or diluted, coloured, mixed with fillers or vulcanizing agents, the last being used in such a quantity that the final product remains soft (flexible) and does not become ebonite, the reinforcing material may be felt, cloth, matting, paper or the like, or a mixture of latex with a pulverulent material like coir or peat dust, or with a material like wood fibre, rice husks or the like.

In all these cases the characteristic of the method is that the dry sheet of soft rubber and the reinforcing material are united by means of latex dried in between them.

The latex can also be replaced by another aqueous dispersion of rubber. In the claims the term "latex" means in general any aqueous dispersion of rubber or similar to latex.

The invention is not limited to the production of articles of flat shape, since the dry rubber sheet obtained by the setting of the latex poured on the flat plate may be detached therefrom and readily combined with porous materials in curved or angular shape; the union of the materials is obtained by simply drying out, without the application of pressure beyond that desirable for bringing the components into contact and for removing air bubbles from between the surfaces. I make no claim to the production of rubber goods comprising layers of hard rubber or ebonite, and I wish to exclude such materials from the scope of the invention by the use of the term "soft-rubber."

I claim:

1. The process of manufacturing soft rubber products which comprises coating a composition comprising liquid rubber latex upon a substantially non-porous surface having a depressed or raised design, said composition being of a character that when it is dried it will yield a soft rubber mass, drying said coating to form a sheet of soft rubber with a design formed on one surface thereof by the design on the non-porous surface, applying to said so formed sheet, on the side which does not carry the above mentioned design, a mixture comprising liquid rubber latex and discrete organic filler, the said rubber sheet being removed from the said non-porous surface at some stage after the formation of said soft rubber sheet, and drying the said mixture applied to the said soft rubber sheet.

2. The process of manufacturing soft rubber products which comprises coating a composition comprising liquid rubber latex upon a substantially non-porous surface having a depressed or raised design thereon, said composition being of a character that when it is dried it will yield a soft rubber mass, drying said coating to form a sheet of soft rubber with a design formed on one surface therof by the design on the non-porous surface, applying to said so formed sheet, on the side which does not carry the above mentioned design, a mixture comprising liquid rubber latex and fibrous material, the said soft rubber sheet being removed from the said non-porous surface at some stage after the formation of said soft rubber sheet and drying the said mixture applied to the said soft rubber sheet.

3. The process of manufacturing soft rubber products which comprises coating a composition comprising liquid rubber latex upon a substantially non-porous surface having a depressed or raised design thereon, said composition being of a character that when it is dried it will yield a soft rubber mass, drying said coating to form a sheet of soft rubber with a design formed on one surface thereof by the design on the non-porous surface, applying to said so formed sheet, on the side which does not carry the above mentioned design, liquid rubber latex, and applying over said last mentioned liquid rubber latex a mixture comprising liquid rubber latex and soft discrete organic filler, the said rubber sheet being removed from the said non-porous surface at some stage after the formation of said soft rubber sheet, and drying the liquid rubber latex applied to said soft rubber sheet and the said applied mixture.

4. The process of manufacturing a soft rubber product which comprises coating a composition comprising liquid rubber latex upon a substantially non-porous surface, said composition being of a character that when it is dried it will yield a soft rubber mass, drying said coating to form a sheet of soft rubber, applying upon said sheet of soft rubber a layer of a mixture comprising liquid rubber latex and filler, the said sheet being removed from the said surface at some stage after the formation of said soft rubber sheet, drying the said mixture to form a composite body and thereafter joining two of such composite bodies together with the said dried layer formed of the composition including rubber latex and filler abutting against each other face to face.

PIETER J. S. CRAMER.